May 5, 1970 C. J. DUMAS 3,510,723

CENTERING CIRCUIT

Filed Feb. 20, 1969

INVENTOR.
CHRIST J. DUMAS
BY
Petherbridge, O'Neill & Aubel
ATTORNEYS

United States Patent Office 3,510,723
Patented May 5, 1970

3,510,723

CENTERING CIRCUIT

Christ J. Dumas, Forest View, Ill., assignor to American Plasticraft Company, Chicago, Ill., a corporation of Illinois Filed Feb. 20, 1969, Ser. No. 801,078
Int. Cl. H01j 29/76
U.S. Cl. 315—27 7 Claims

ABSTRACT OF THE DISCLOSURE

The invention discloses a circuit for centering the raster produced on a cathode ray tube and, more specifically, a television picture tube.

As is known, in present commercial television systems a raster is re-produced on the fluorescent screen of the cathode ray tube, or so-called picture tube, by the electron beams which are magnetically deflected by a horizontal magnetic deflection system to trace successive lines forming the raster on the screen.

The horizontal deflection system now commonly employed in television receivers includes an output or driver tube, an output transformer and a magnetic deflection yoke whose horizontal deflection coils are connected to the transformer.

Usually, the transformer is an auto-transformer which also provides the high voltage for the second anode of the cathode ray tube. A signal of suitable form is supplied to the driver tube which conducts during approximately the whole of the trace interval to provide a line of the raster, then is cut off during the retrace interval, and then provides another line of the raster, etc. Centering of the raster is conventionally accomplished by controlled flow of direct current in the coil windings of the deflection systems.

One prior technique for providing centering control is to bifilar wind the complete primary and split one of the series windings to connect to the centering control. However, this type of system will permit circulating currents to be generated by unequally loaded bifilar windings and cause the transformer to overheat.

Accordingly, it is a principal object of the present invention to provide a centering circuit which minimizes any circulating currents, is stable and reliable in operation and has a variety of applications.

A unique feature of the inventive circuit is that it does not contribute to overheating of the transformer, since the circuit current is in series with the yoke feed.

More specifically, the centering circuit of the invention utilizes a low resistance potentiometer having an adjustable tap, one terminal of the potentiometer is connected to an input transformer and the other terminal is connected to the deflection coil or yoke. A diode is connected in the circuit to have one electrode connected to a midpoint of said potentiometer and its other electrode connected to the adjustable tap to rectify a portion of the current applied by the transformer to the deflection yoke. The rectified current is then coupled back to the potentiometer to be applied to the yoke in a selected polarity with the polarity of the rectified current being controlled by the positioning of the adjustable tap relative to the midpoint connection.

At the outset it should be emphasized that while the inventive centering circuit has specific utility as a centering circuit for horizontal deflection systems of TV receivers, the inventive circuit is also useful as a centering circuit for the vertical deflection systems of TV receivers; and, more generally, as a centering circuit for deflection systems of cathode ray tubes.

Thus, the invention provides a deflection system including improved means for centering the raster of a television picture tube.

The foregoing and other objects, features and advantages of the invention will be apparent from the following more particular description of preferred embodiments of the invention, as illustrated in the accompanying drawings wherein.

Figure 1:
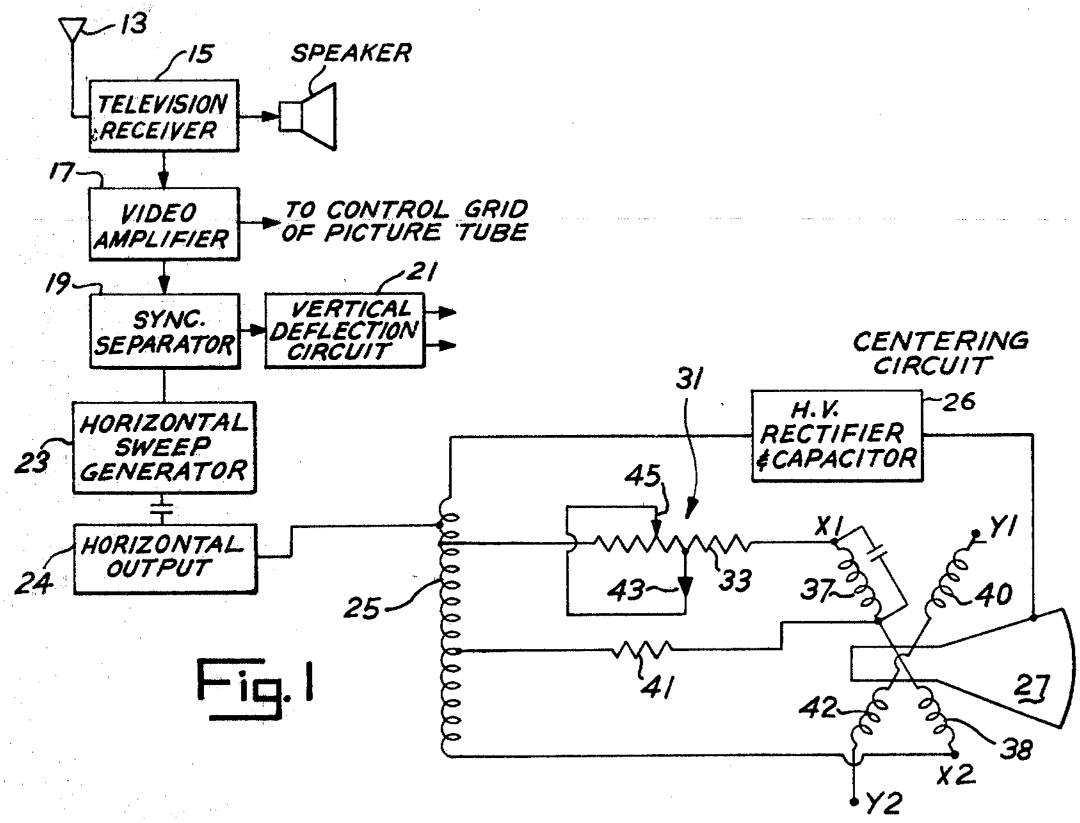
FIG. 1 is a schematic diagram of a centering circuit in accordance with the invention.

FIG. 1 includes a schematic diagram of a deflection circuit arrangement for use with a television receiver comprising circuits which may be conventional and which are shown only to illustrate the setting of the invention. Television signals appearing at an antenna 13 are applied to a television receiver 15 thence to video amplifier 17, sync separator 19, horizontal deflection circuit 23 and the horizontal output circuit 24 to the flyback auto-transformer 25 and to the centering circuit 31 of the invention.

As is known, the horizontal output circuit 24 provides a sawtooth signal to the transformer 25. A conventional circuit 26 comprising a high voltage rectifier and a high voltage capacitor provide a high voltage to the cathode ray tube 27.

The centering circuit 31 comprises a potentiometer 35 having one terminal, the left-hand terminal as oriented in FIG. 1, connected to the transformer 25, the other or right-hand terminal of potentiometer 33 is connected to one terminal of the horizontal deflection yoke or system 39 consisting of series connected winding sections 37 and 38. The other terminal of deflection system 39 is connected to the low potential point on transformer 25.

The junction of the yoke windings 37 and 38 is connected to a midpoint on transformer 25 through a resistor 41 which tends to limit circulating currents and to stabilize the voltage across the yoke.

A unilateral conducting device such as a diode 43 has its anode connected to a midpoint on potentiometer 33 and its cathode connected to a readily adjustable tap 45. Note at the outset that diode 43 could also be connected in an opposite polarity, that is, its cathode connected to the midpoint on potentiometer 33 and its anode connected to tap 45.

The diode 43 rectifies a portion of the current flowing through the potentiometer 33 and couples this rectified current through the adjustable tap 45 back to the potentiometer to bias the yoke windings in a positive or negative direction (dependent on the polarity in which the diode 43 is connected) causing the center of deflection to be changed. The D.C. level of the yoke is varied by the amount of rectified current. The diode 43 must have the minimum peak inverse voltage capacity to handle the worst case situation, which parameter may either be empirically or theoretically determined. Note also that the diode 43 is always connected in the circuit and is not switched in and out.

The resistance of the potentiometer 33, and the polarity connection of diode 43 will depend primarily on the condition or the amount of centering desired.

In one embodiment a 10 ohm potentiometer is used to obtain plus or minus 7/16 center variation on a 25" tube. The diode is placed in position such that the movement of the raster corresponds to the direction of movement of the centering control adjustment, that is, the control which moves tap 45. As mentioned above, the diode can be connected in either polarity depending on the position of the control adjustment in reference to the direction of mechanical adjustment. For example, if the control adjustment (knob) is in front of the TV set, the diode can be connected in one polarity and if the control adjustment is in back of the TV set, the diode can be connected in the other polarity such that movement of the knob corresponds to the desired movement of the raster.

The circuit provides a high degree of selectivity because of the capability of controlling both the right and left movement of the raster. The sensitivity of the circuit depends primarily on the network and diode potential.

Figure 2:
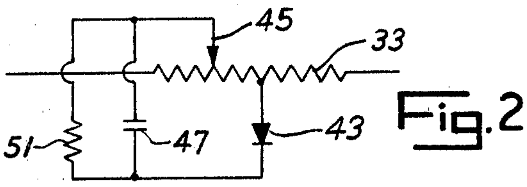
FIG. 2 shows a modification of the potentiometer control shown in FIG. 1.

A modification of the centering circuit 31 is shown in FIG. 2 wherein a capacitor 47 functions as a filter connected across the diode 43 to the top 45 to smooth the biasing current provided through potentiometer 33 to yoke X1–X2. A resistor 48 connected in parallel with capacitor 47 assists in shunting any arcing and functions as a pulse limiter during adjustment.

Figure 3:
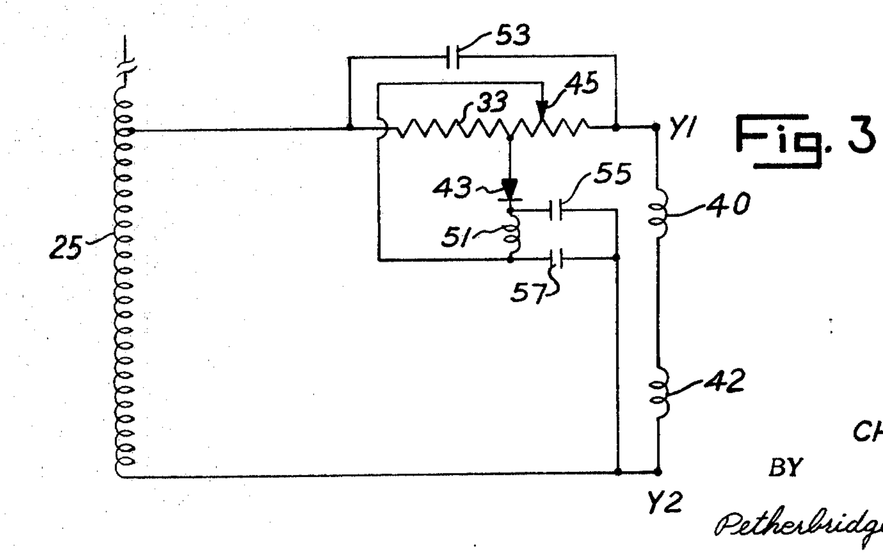
FIG. 3 shows a second modification of the potentiometer control shown in FIG. 1.

FIG. 3 shows another modification of the circuit of FIG. 1 wherein additional components are added to the basic circuit 31.

Note that the centering circuit 31A is shown as being connected to the vertical deflection yoke Y1–Y2 having series connected sections 40 and 42. Such a vertical deflection circuit could be connected to the output of the vertical deflection ciruit 21 of FIG. 1.

In the circuit 31A, the anode of diode 43 is connected to a midpoint of potentiometer 43 and its cathode is connected through a series inductance 51 to tap 45. A first capacitor 53 is connected across potentiometer 33. Another capacitor 55 is connected from the junction of the diode 43 and inductance 51 to the low potential side of transformer 25, and a third capacitor 57 is connected from the junction of inductance 51 and tap 45 to the low potential side of transformer 25. The circuit 31A functions similarly to circuit 31 and the inductance 51, and capacitors 55 and 57 all function to smooth the biasing current provided to the yoke Y1–Y2. Capacitor 53 filters any variations in the current developed across potentiometer 33. Also, circuit 31A does not include resistor 41 of circuit 31.

The invention may also be used in conjunction with other components such as voltage doublers, triplers, and high voltage rectifiers and capacitor systems. Also, the invention is useful in conjunction with solid-state devices.

Accordingly, while the invention has been particularly shown and described with reference to preferred embodiments thereof, it will be understood by those skilled in the art that changes in form and details may be made therein without departing from the spirit and scope of the invention.

I claim:

1. A raster centering circuit for centering the raster produced on an electron beam control tube of the type wherein a transformer receives an input signal utilized for providing a raster on the tube and wherein a magnetic deflection system including inductance coils is employed; said centering circuit comprising a potentiometer serially connected from said transformer to one terminal of said coils, a movable tap on said potentiometer, a diode having one electrode connected to a midpoint on said potentiometer and its other electrode connected to said movable tap whereby a portion of the energy provided across said potentiometer is rectified and fed back to control the direct current biasing level coupled to said coils to thereby selectively position said raster.

2. A centering circuit as in claim 1 wherein a capacitor is connected from said movable tap to the electrode of said diode remote from said potentiometer.

3. A centering circuit as in claim 1 wherein the anode of said diode is connected to said potentiometer.

4. A centering circuit as in claim 1 wherein the cathode of said diode is connected to said potentiometer.

5. A centering circuit as in claim 1 wherein filtering means are connected to said diode to smooth out direct current ripples.

6. A centering circuit as in claim 1 wherein said inductance coils comprise two series connected coils, and wherein a resistor connects the junction of said coils to a midpoint on said transformer.

7. A centering circuit as in claim 1 wherein parallel connected capacitor and resistor means are connected in series from said movable tap to said diode.

References Cited

UNITED STATES PATENTS

| | | | |
|---|---|---|---|
| 2,646,527 | 7/1953 | Mathes | 315—27 |
| 2,637,832 | 5/1953 | Rogers | 315—27 |
| 2,743,382 | 4/1956 | Lufkin | 315—27 |

RODNEY D. BENNETT JR., Primary Examiner

J.G. BAXTER, Assistant Examiner